July 3, 1934.   J. C. HANSEN-ELLEHAMMER   1,964,796
FUEL SUPPLY IN DIESEL MOTORS AND THE LIKE
Filed March 28, 1931
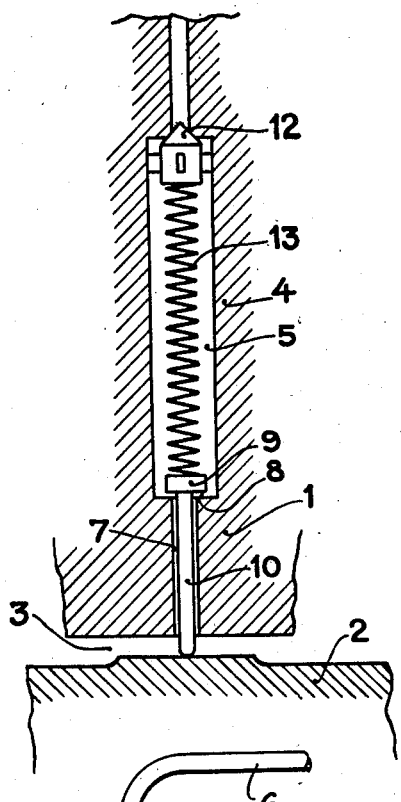
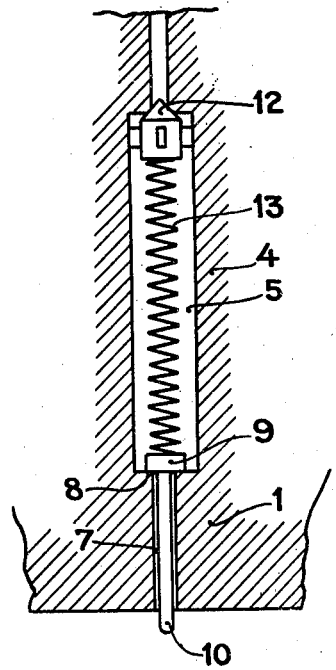
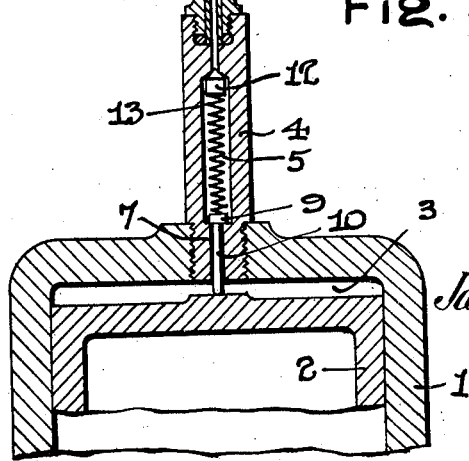
Inventor
Jakob Christian Hansen-Ellehammer
per *signature*
Attorney Patented July 3, 1934

1,964,796

UNITED STATES PATENT OFFICE 1,964,796

FUEL SUPPLY IN DIESEL MOTORS AND THE LIKE

Jacob Christian Hansen-Ellehammer, Hellerup, Denmark

Application March 28, 1931, Serial No. 525,965
In Denmark April 7, 1930

3 Claims. (Cl. 123—32)

The present invention relates to a method of fuel supply in Diesel-motors and the like and means for carrying out the said method, which latter consists in this that the fuel is supplied at a pressure above the compression pressure but below the explosion pressure of the motor. The fuel is sprayed into the cylinder at a pressure equal to the difference between the pressure of supply and the compression pressure when suitable inlet means arranged in the cylinder is operated by the piston directly before the piston will reach its upper dead centre. Under these circumstances the fuel will flow into the compression space at high speed until the said space will contain the fuel mass necessary for an explosion, and the pressure arising from the explosion will then momentarily stop the fuel inlet.

In the accompanying drawing means for carrying out the method according to the invention is shown.

Fig. 1 is an axial section through the upper portion of the cylinder of a two stroke motor of the said kind and Figs. 2 and 3 are diagrammatical detail views at a large scale.

1 is the cylinder, 2 the piston and 3 the compression space in which the introduced air is compressed until up to a temperature corresponding to the ignition temperature of the vaporated fuel, for instance solar oil.

Screwed into the cylinder head is a tube 4 the inner space 5 of which is connected partly to the fuel tank (not shown in the drawing) through a pipe 6, partly to the cylinder 1 through an inlet passage 7. In the following specification with claims the said space 5 will be called the fuel space.

At the bottom of the fuel space 5 a valve seat 8 of a valve 9 is provided the valve stem 10 of which is led through the inlet 7 and projecting so far into the cylinder 1 that it may just be acted upon by the piston directly before the upper dead centre. The valve stem 10 does not fit closely in the inlet passage leaving a very narrow annular passage between itself and the wall of the inlet passage.

In the fuel space 5 a valve 12 is provided which may stop the fuel supply through the pipe 6 and the weight of which is carried by a spring 13 abutting the valve body 9.

It be assumed that the compression pressure is about 30 atmospheres, the pressure in the fuel tank about 60 atmospheres and the explosion pressure in the cylinder above 60 atmospheres; then the operation of the motor will appear from the following statement.

In Fig. 3 the piston 2 is shown on its upward stroke the inlet of fresh air and the scavenging of exhaust gases being completed. The valve body 9 rests on its seat 8 acted upon by the pressure of 60 atmospheres in the fuel tank. The fuel space 5 is almost filled with fuel and the valve 12 is held on its seat by a light pressure of the spring 13.

During the upward stroke of the piston the air is compressed in the space 3 the volume of which will rapidly be decreased and it is so arranged that when reaching the end of the stem 10 the piston will only be spaced apart from its upper dead centre by a very small distance. The compression is practically completed so that the compressed air is heated to the ignition temperature of the fuel which for instance may be solar oil.

When touching the stem 10 the piston will lift it slightly and the fuel will then be forced into the cylinder at the pressure (60 atmospheres) in the fuel tank and the fuel space 5 and passing through the narrow annular passage 7 the fuel being thereby vaporized. At this moment a vaporized fuel cloud will therefore be forced into the compressed air. The fuel will not be introduced in predetermined quantities, but it will flow into the compression space until this space will contain just the quantity necessary for an explosion.

Now all the conditions necessary for an explosion are fulfilled and the explosion will occur. By the explosion pressure every fuel inlet through the passage 7 will momentarily be stopped. The explosion pressure will be transmitted to the fuel space 5 but not so far as to the fuel tank this being prevented by the valve 12.

On the downward stroke of the piston after the explosion having taken place the pressure in the cylinder will decrease, and when the piston has reached the point when the pressure in the cylinder has decreased below the 60 atmospheres of the fuel tank the latter pressure will close the valve 9 the fuel space being filled up with fuel from the fuel tank.

The piston 2 will then reach its lower dead centre where the gases will be exhausted and fresh air admitted and the cycle will commence again as before.

I claim:

1. Fuel supply apparatus for a Diesel motor and the like, including the combination, with a cylinder, a piston reciprocable in said cylinder, and a fuel supply pipe, of means for controlling the feeding of the fuel from said supply pipe to the interior space in said cylinder, comprising a fuel chamber intermediate the fuel supply pipe and said interior cylinder space communicating at one end with said cylinder space through a duct and also communicating at the other end thereof with said fuel supply pipe, a valve in said fuel chamber adapted to close the fuel chamber in the direction of the piston and cut off communication between said chamber and the cylinder space, and a valve stem upon said valve extending through said duct and projecting to a limited distance into said cylinder space in order to be moved in limited manner by direct contact with the piston upon the latter approaching extreme dead center, whereby to open said valve and inject fuel into said cylinder space, and independent means disposed within said fuel chamber for interrupting the flow of fuel from the fuel supply pipe to said chamber and operable upon opening of said valve by the impulse of the explosion in said cylinder.

2. Fuel supply apparatus for a Diesel motor and the like, including the combination, with a cylinder, a piston reciprocable in said cylinder, and a fuel supply pipe, of means for controlling the feeding of the fuel from said supply pipe to the interior space in said cylinder, comprising a fuel chamber intermediate the fuel supply pipe and said interior cylinder space communicating at one end with said cylinder space through a duct and also communicating at the other end thereof with said fuel supply pipe, a valve in said fuel chamber for closing the communication between the fuel chamber and the cylinder space, a valve stem upon said valve extending through said duct and projecting to a limited distance into said cylinder space in order to be moved in limited manner by direct contact with the piston upon the latter approaching extreme dead center, whereby to open said valve and inject fuel into said cylinder space, and a second valve disposed in said fuel chamber at the end adjacent to said fuel supply pipe adapted to check the flow of fuel from said supply pipe into said chamber and operable temporarily to check said flow by an impulse transmitted from an explosion in said cylinder through the fuel in said duct and in said fuel chamber.

3. Fuel supply apparatus for a Diesel motor and the like, including the combination, with a cylinder, a piston reciprocable in said cylinder, and a fuel supply means, of means for controlling the feeding of the fuel from said supply means to the interior space in said cylinder, comprising a fuel chamber interposed between the fuel supply means and said interior cylinder space, which fuel supply means is adapted to feed the fuel to said fuel chamber at a continuous and controllable pressure above the value of the compression pressure of the cylinder, a valve interposed between said fuel chamber and said fuel supply means, which valve is automatically closed by the pressure produced in the cylinder during the ignition, and independent means directly operable by contact with the piston in said cylinder for controlling the connection between said fuel chamber and said cylinder space.

JACOB CHRISTIAN HANSEN-ELLEHAMMER.